(12) United States Patent
Chandrasekar et al.

(10) Patent No.: US 8,073,843 B2
(45) Date of Patent: Dec. 6, 2011

(54) MECHANISM FOR DEFERRED REWRITE OF MULTIPLE XPATH EVALUATIONS OVER BINARY XML

(75) Inventors: Sivasankaran Chandrasekar, Menlo Park, CA (US); Balasubramanyam Sthanikam, Foster City, CA (US); Sam Idicula, Santa Clara, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 399 days.

(21) Appl. No.: 12/181,725

(22) Filed: Jul. 29, 2008

(65) Prior Publication Data
US 2010/0030726 A1 Feb. 4, 2010

(51) Int. Cl.
G06F 7/00 (2006.01)
(52) U.S. Cl. ........................................................ 707/718
(58) Field of Classification Search .................. None
See application file for complete search history.

(56) References Cited

U.S. PATENT DOCUMENTS

| | | | |
|---|---|---|---|
| 6,285,997 B1 * | 9/2001 | Carey et al. ........................ 1/1 |
| 7,596,559 B2 | 9/2009 | Popa et al. |
| 2003/0140308 A1 | 7/2003 | Murthy et al. |
| 2004/0064466 A1 * | 4/2004 | Manikutty et al. ............ 707/100 |
| 2004/0128296 A1 | 7/2004 | Krishnamurthy et al. |
| 2005/0005261 A1 | 1/2005 | Severin |
| 2005/0055355 A1 | 3/2005 | Murthy et al. |
| 2005/0228792 A1 * | 10/2005 | Chandrasekaran et al. ...... 707/9 |
| 2005/0228828 A1 | 10/2005 | Chandrasekar et al. |
| 2005/0229158 A1 * | 10/2005 | Thusoo et al. .................. 717/115 |
| 2006/0041537 A1 | 2/2006 | Ahmed |
| 2006/0101073 A1 * | 5/2006 | Popa et al. .................. 707/104.1 |
| 2006/0143557 A1 | 6/2006 | Chan et al. |
| 2006/0179068 A1 | 8/2006 | Warner et al. |
| 2006/0212420 A1 | 9/2006 | Murthy |
| 2006/0224564 A1 * | 10/2006 | Yu et al. ........................... 707/2 |
| 2006/0235840 A1 * | 10/2006 | Manikutty et al. ................ 707/4 |
| 2007/0011167 A1 | 1/2007 | Krishnaprasad et al. |
| 2007/0016605 A1 | 1/2007 | Murthy et al. |
| 2007/0112813 A1 | 5/2007 | Beyer et al. |
| 2007/0112851 A1 | 5/2007 | Tomic et al. |
| 2007/0239681 A1 | 10/2007 | Krishnaprasad et al. |
| 2010/0030727 A1 | 2/2010 | Chandrasekar et al. |
| 2010/0036825 A1 | 2/2010 | Chandrasekar |

OTHER PUBLICATIONS

Krishnaprasad et al., "Query Rewrite for XML in Oracle XML DB," Proceedings of the 30th VLDB Conference, 2004.*
Krishnaprasad et al., "Query Rewrite for XML in Oracle XML DB," Proceedings of the 30th VLDB Conference, 2004.*
Alin Deutsch et al., "Reformulation of XML Queries and Constraints", ICDT 2003, pp. 225-241.

(Continued)

Primary Examiner — Tim T Vo
Assistant Examiner — Aaron Sanders
(74) Attorney, Agent, or Firm — Hickman Palermo Truong & Becker LLP

(57) ABSTRACT

A mechanism is provided for improving the performance of particular database queries operating on a view comprising binary-encoded XML. A determination is made about whether a XML index is available to improve the computation of XPath data before deriving an optimized execution plan for a particular query. When a XML index is not available to help expedite the computation of binary-encoded XML, then deferring the computation of the XPath data until after the view merge stage avoids unnecessary computation of XPaths that are part of the view but not needed for the particular query.

16 Claims, 2 Drawing Sheets

OTHER PUBLICATIONS

Hong Su et al., "Semantic Query Optimization for XQuery over XML Streams", Proceedings of the 31$^{st}$ VLDB Conference, Trondheim, Norway, 2005, pp. 277-288.

Attila Barta et al., "Benefits of Path Summaries in an XML Query Optimizer Supporting Multiple Access Methods", Proceedings of the 31$^{st}$ VLDB Conference, Trondheim, Norway, pp. 133-144, 2005.

* cited by examiner

MECHANISM FOR DEFERRED REWRITE OF MULTIPLE XPATH EVALUATIONS OVER BINARY XML

RELATED APPLICATIONS

This application is related to U.S. application Ser. No. 10/884,311 entitled Index for Accessing XML Data filed on Jul. 2, 2004, the contents of which are herein incorporated by reference, and to U.S. application Ser. No. 10/944,170 entitled Efficient Query Processing of XML Data Using XML Index filed on Sep. 16, 2004, the contents of which are herein incorporated by reference.

FIELD OF THE INVENTION

The present invention relates to database systems, and in particular, to optimization of queries that access XML data stored in a database system.

BACKGROUND

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML values are referred to herein as base tables or objects.

Such database servers include many mechanisms that allow for powerful and efficient ways to query large collections of XML documents. Database servers that store XML documents may be enhanced to efficiently perform XML operations using these mechanisms. One such type of XML operation is to execute queries over collections of XML documents using XML query languages, such as XQuery/XPath. XML Query Language ("XQuery") and XML Path Language ("XPath") are important standards for a query language, which can be used in conjunction with SQL to express a large variety of useful queries. The term XML query is used to refer to queries that conform to (1) XQuery, XPath, and/or another XML language standard, (2) queries including SQL queries that may embed XQuery or XPath expressions, and (3) proprietary dialects of XQuery, XPath, SQL, or XML standard languages. When a database server receives a XML query, the database server may perform a XML rewrite to refer to the underlying base tables and database objects that store the XML data.

Views that Access XML Data

Applications create and maintain views to provide an abstraction over data stored in a database. The users of these views are insulated from the actual view definition. The term "view" refers to a predefined query that is treated as a table. A view is thus essentially a virtual table and may be referenced by a database statement as if the view were an actual table. Tables that actually store the data associated with a view are referred to as "base tables." Base tables are referenced, directly or indirectly, by the predefined query. To generate the rows of a view, data is extracted and derived from the base tables. A use case is to provide a relational view of XML data allowing a bridge to legacy relational applications.

A pre-defined view is one defined outside of the query in which it is used. Here is an example of a pre-defined view:

CREATE VIEW v AS
SELECT XP1 as number, XP2 as string, XP3 as date
FROM xml-source View v provides a relational abstraction over XML data. Users of this view do not need to know their input is driven from a XML source—they can simply rely on the 3 relational columns in building their applications. XP1, XP2, and XP3 are XPath based expression such as the extractValue function defined in SQL/XML. Expressions are cast by a query to scalar data types. XP1 is cast as a number type, XP2 is cast as a string type, and XP3 is cast as a date type. The expression xml-source represents a source of XML documents stored in a database system, such as a table that holds XML documents in a column.

Described herein are techniques to optimize queries on views that provide an abstraction over a collection of XML documents.

DETAILED DESCRIPTION

Figure 1:
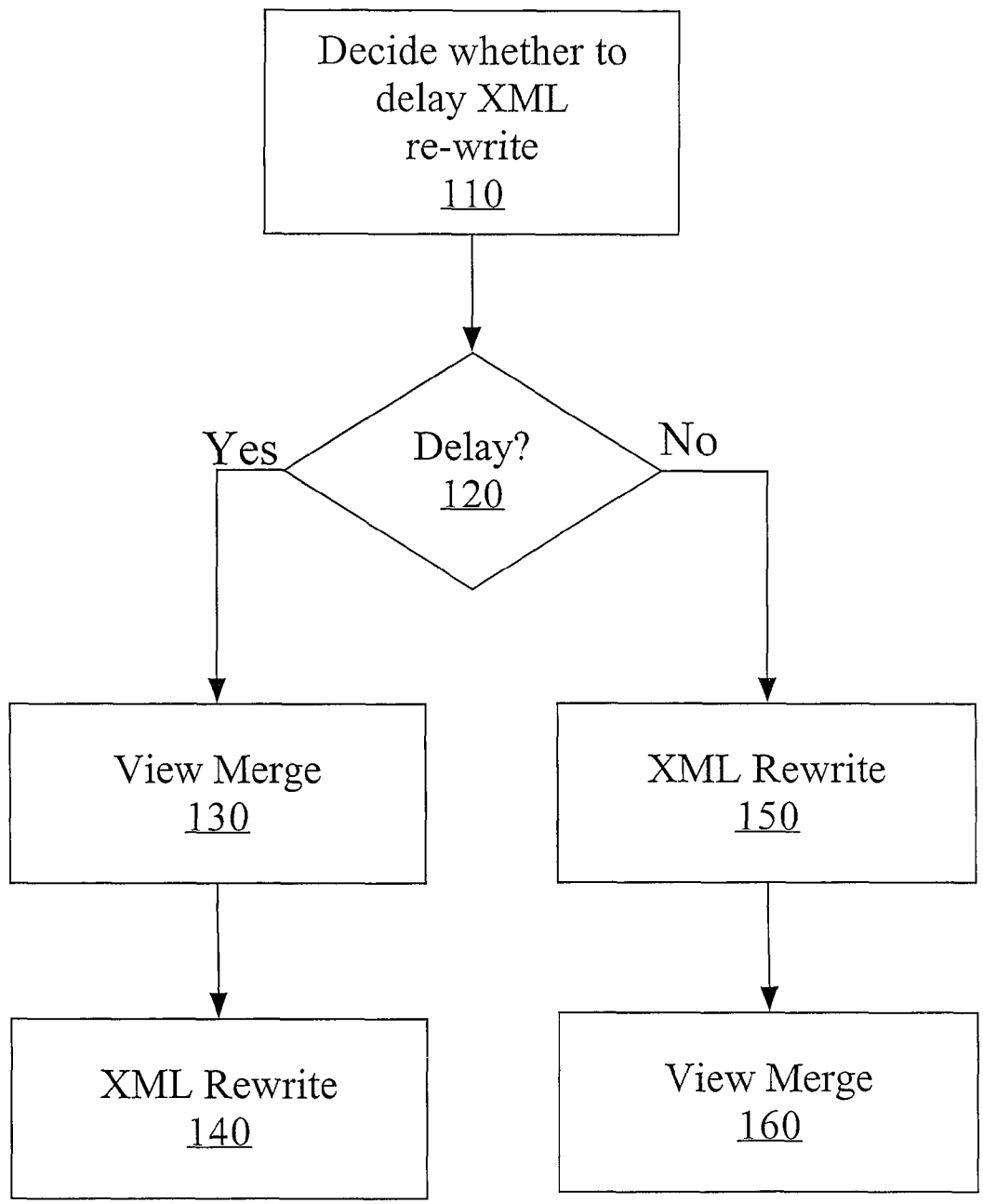
FIG. 1 is a flow chart of the steps used to create a relative order between view merge and XML re-writing in the global execution plan.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for improving the performance of particular database queries that operate on a view that comprises binary-encoded XML. A query optimizer determines the order of query transformations to optimize the query. In some cases, performing a first transformation that results in an improvement in query execution can adversely affect the ability of the optimizer to recognize the opportunity for another transformation. The relative ordering of the view merge and XML re-writing optimization may affect the ability of the optimizer to remove expressions in the view definition that are not required to correctly compute a query. According to one aspect of the present invention, the query optimizer may consider the availability of a XML index (also described in detail below) when choosing the order of the query transformations.

Operating Environment

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A relational or object-relational database server may be extended to provide native support for storage, management, and query of (and thus function as a repository for) particular types of data. For example, a traditional relational database system may be augmented with features and technologies to enable storage of XML documents directly in the database, and access to such XML data in either a XML-centric (e.g., using XPath and the XQuery query language) or a relational-centric (e.g., using the SQL/XML query language) manner. Such a repository is at times referred to as a XML repository or a XML database (i.e., "XML DB").

A database server may include a query optimizer responsible for generating an optimized execution plan to compute a query. A query optimizer may also optimize a query by transforming the query. In general, transforming a query involves rewriting a query into another query that should produce the same result and that can potentially be executed more efficiently, i.e. one for which a potentially more efficient and less costly execution plan can be generated. The query as transformed is referred to herein as the transformed query. The query is rewritten by manipulating a copy of the query representation to form a transformed query representation representing a transformed query.

During query optimization, a XML query referencing XML data may be rewritten to reference the base database objects and data structures that hold the XML data and/or to reference functions that are used to access these database objects and structures. This kind of transformation is called XML re-write.

Stages of Query Optimization

The query optimizer performs a sequence of transformations on the query as the query undergoes several stages of analysis including semantic analysis, XML rewriting, view merge, and type checking. XML re-writing and view merge are two of the stages where important optimizations occur. Optimizations at both of these stages may be performed when a XML query is being processed by the optimizer.

Re-writing a query to merge views involves, in effect, removing sub-queries representing a query defining a pre-defined view. In the previous example of a view, v is a pre-defined view. When a query references a pre-defined view, the step of view merging involves substituting the view alias with the view definition, and then simplifying to merge the resulting inner and outer queries.

Consider the following query:
select XP1 from v where XP2="foo"
Substituting the view definition results in the following transformed query:
select XP1 from (select SELECT XP1 as number, XP2 as string, XP3 as date
FROM xml-source) where XP2="foo"
Finally, after merging the inner query with the outer query, the transformed query looks like:
select XP1 from xml-source where XP2="foo"
Notice that XP3 does not appear in this transformed query. The expression was eliminated because the optimizer recognized that it was not required to compute a correct result. This process is referred to as expression pruning.

Delayed XML Rewrite

With potential optimizations at several stages of query processing, the order in which the optimizations are performed can have an effect on the overall performance of query execution. In one embodiment, a decision is made as to the relative order of performing view merge and XML re-write.

In the example query above, XP3 is included in the pre-defined view definition. If XML re-write occurs before view merge, then XP3 will be re-written even though the result is not needed to evaluate the query. Not only is the time spent re-writing XP3 wasted, but there is a chance that the view merge optimization stage will no longer recognize the re-written form of XP3 as a candidate for elimination. In that case, the re-written form of XP3 will be evaluated when the query executes even though the evaluation of XP3 will not contribute to the correct results.

Another example of when performing XML re-write before the view merge stage is wasteful occurs when an application simply needs a count of rows from a view. There is no need to evaluate all of the columns of a view in order to count the rows. The general rule is that only the XPath expressions that are selected in the outer query need to be evaluated when constructing the pre-defined view, but elimination of unnecessary XPath expressions is not performed until the view merge step.

FIG. 1 shows a flow chart for determining the sequence of optimization steps. The first step is to decide whether to defer the XML re-write stage of query processing until after the View Merge stage (Step 110). If the decision is to delay XML re-write (Step 120), then View Merge is performed first (Step 130) and then XML re-write is performed after View Merge (Step 140). If the decision is not to delay XML re-write, then XML re-write is performed first (Step 150) and View Merge is performed after XML re-write (Step 160).

The effect of delaying the XML re-write until after view merge is that unnecessary XPath expressions are eliminated from the transformed query (in our example, XP3 is eliminated) before the XML re-write stage. As a result, only the XPaths needed in the transformed query are re-written and finally evaluated.

Token-Based Compression of XML Data

When XML is stored in the database, it is first compressed to reduce the amount of space it requires. One way of storing XML data is to convert text based XML in a binary encoding that gets stored and indexed. Token-based compression is a type of binary encoding that involves parsing the XML into tokens and creating a token table. The tag strings are replaced with token identifiers in the binary-encoded representation.

The tag ids require less space to represent than the tag strings, and thus, provide compression of the XML data.

Use of XML Index

In order to speed up the access to binary encoded XML stored in the database as described above, a XML index can be used. A database server may maintain a "logical index", which indexes a collection of XML documents. A logical index contains multiple structures that are cooperatively used to access a collection of XML documents. A logical index includes a path table, which contains information about the hierarchies of nodes in a collection of XML documents and may contain the value of the nodes. Among the columns or attributes of the path table is a column that stores the path id of nodes. The XML index is described in greater detail in Index for Accessing XML Data (US Patent Publication 2005-0228792A1).

In one embodiment of the present invention, the availability of a XML Index causes the query optimizer to choose to perform XML re-writing before view merge. The XML re-write rewrites the query to refer to tables and database objects that comprise the XML index. In an embodiment, it is only in the absence of such a XML index, that XML re-writing is deferred until after the view merge stage of optimization.

Hardware Overview

Figure 2:
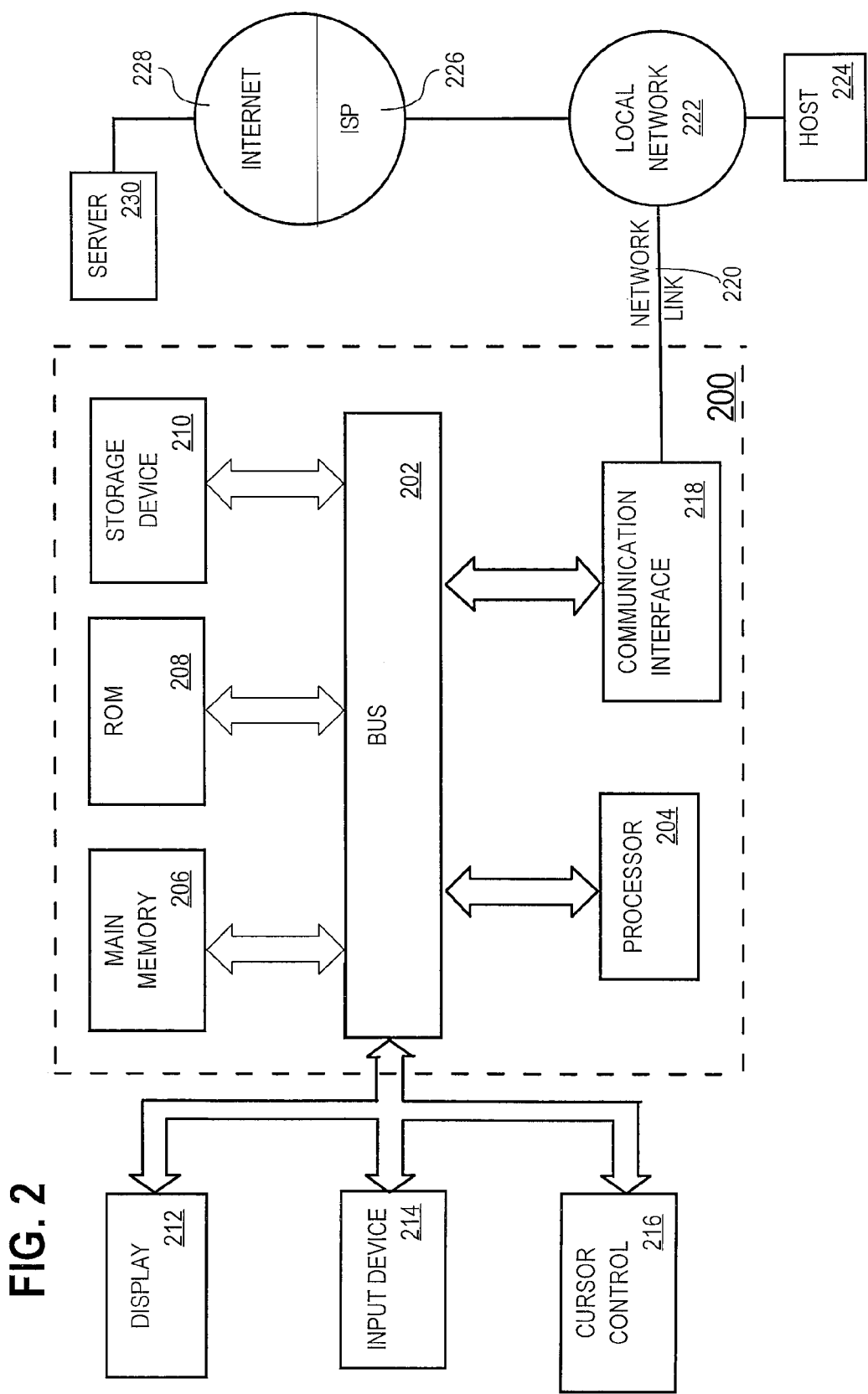
FIG. 2 is a block diagram that illustrates a computer system.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising steps of:
a database server receiving a certain query, wherein said certain query references a view;
in response to receiving said certain query, said database server:
determining whether or not to defer a XML rewrite of a certain query until after performing a view merge of said certain query;
in response to determining to defer said XML rewrite of said certain query:
performing a view merge of said certain query; and
subsequent to performing said view merge of said certain query, performing said XML rewrite of said certain query;
in response to determining not to defer said XML rewrite of said certain query, performing said XML rewrite; and
subsequent to performing said XML rewrite, performing said view merge of said certain query; and
executing said certain query.

2. The method of claim 1, before performing said XML rewrite, transforming said query by eliminating an expression defined by the definition of said view.

3. The method of claim 1, wherein the step of determining to defer a XML rewrite is further comprised of:
determining whether or not an XML index exists that can be used to optimize said certain query; and
in response to determining that said XML index does not exist, deciding to defer the XML rewrite of said certain query.

4. The method of claim 3, wherein the XML index contains a row for each node in a set of XML documents, and wherein said row contains the value of the node.

5. The method of claim 4, wherein performing said XML rewrite of said certain query includes rewriting the query to refer to a database object of the XML index.

6. The method of claim 1, wherein the view returns relational scalar attributes generated from a XML source.

7. The method of claim 1, wherein the view references a table that includes token-based compression of XML data.

8. A non-transitory computer-readable storage medium storing one or more sequences of instructions which, when executed by one or more processors, causes the one or more processors to perform:
a database server receiving a certain query, wherein said certain query references a view;
in response to receiving said certain auery said database server:
determining whether or not to defer a XML rewrite of a certain query until after performing a view merge of said certain query;
in response to determining to defer said XML rewrite of said certain query:
performing a view merge of said certain query; and
subsequent to performing said view merge of said certain query, performing said XML rewrite of said certain query;
in response to determining not to defer said XML rewrite of said certain query, performing said XML rewrite; and
subsequent to performing said XML rewrite, performing said view merge of said certain query; and
executing said certain query.

9. The non-transitory computer-readable storage medium of claim 8, said one or more sequences of instructions causing said one or more processors to perform, before performing said XML rewrite, transforming said query by eliminating an expression defined by the definition of said view.

10. The non-transitory computer-readable storage medium of claim 8 further comprising one or more sequences of instructions which, when executed by one or more processors, causes the one or more processors to perform:
determining whether or not an XML index exists that can be used to optimize said certain query; and
in response to determining that said XML index does not exist, deciding to defer the XML rewrite of said certain query.

11. The non-transitory computer-readable storage medium of claim 10, wherein the XML index contains a row for each node in a set of XML documents, and wherein said row contains the value of the node.

12. The non-transitory computer-readable storage medium of claim 11, wherein performing said XML rewrite of said certain query includes rewriting the query to refer to a database object of the XML index.

13. The non-transitory computer-readable storage medium of claim 8, wherein the view returns relational scalar attributes generated from a XML source.

14. The non-transitory computer-readable storage medium of claim 8, wherein the view references a table that includes token-based compression of XML data.

15. The method of claim 1, wherein determining to defer a XML rewrite comprised of:
determining whether or not an XML index exists that can be used to optimize said certain query; and
in response to determining that said XML index exists, deciding to rewrite said certain query using said XML index before performing a view merge.

16. The non-transitory computer-readable medium of claim 8, wherein the sequences of instructions for determining to defer a XML rewrite are further comprised of instructions that cause the one of more processors to perform:
determining whether or not an XML index exists that can be used to optimize said certain query; and
in response to determining that said XML index exists, deciding to rewrite said certain query using said XML index before performing a view merge.

* * * * *

UNITED STATES PATENT AND TRADEMARK OFFICE
CERTIFICATE OF CORRECTION

| | | |
|---|---|---|
| PATENT NO. | : 8,073,843 B2 | Page 1 of 1 |
| APPLICATION NO. | : 12/181725 | |
| DATED | : December 6, 2011 | |
| INVENTOR(S) | : Chandrasekar et al. | |

It is certified that error appears in the above-identified patent and that said Letters Patent is hereby corrected as shown below:

In column 8, line 7, in Claim 8, delete "auery" and insert -- query, --, therefor.

Signed and Sealed this
Thirteenth Day of March, 2012

David J. Kappos
*Director of the United States Patent and Trademark Office*